United States Patent
Nagasaka et al.

(10) Patent No.: US 10,382,988 B2
(45) Date of Patent: Aug. 13, 2019

(54) COMMUNICATION DEVICE

(71) Applicant: KYOCERA CORPORATION, Kyoto (JP)

(72) Inventors: Yushi Nagasaka, Ritto (JP); Noriyoshi Fukuta, Inagi (JP); Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 8 days.

(21) Appl. No.: 15/566,245

(22) PCT Filed: Apr. 11, 2016

(86) PCT No.: PCT/JP2016/061673
§ 371 (c)(1),
(2) Date: Oct. 13, 2017

(87) PCT Pub. No.: WO2016/167211
PCT Pub. Date: Oct. 20, 2016

(65) Prior Publication Data
US 2018/0124617 A1    May 3, 2018

Related U.S. Application Data

(60) Provisional application No. 62/148,953, filed on Apr. 17, 2015.

(51) Int. Cl.
*H04W 24/08* (2009.01)
*H04L 12/26* (2006.01)
(Continued)

(52) U.S. Cl.
CPC ......... *H04W 24/08* (2013.01); *H04L 43/0852* (2013.01); *H04W 16/32* (2013.01);
(Continued)

(58) Field of Classification Search
CPC ..... H04W 24/08; H04W 76/10; H04W 16/32; H04W 36/0055; H04W 36/08; H04W 36/12; H04W 72/04; H04L 43/0852
See application file for complete search history.

(56) References Cited

U.S. PATENT DOCUMENTS 9,264,928 B2 *  2/2016  Liu ................... H04W 24/10
2018/0041325 A1 *  2/2018  Lee ...................... H04L 1/00

OTHER PUBLICATIONS

International Search Report issued in PCT/JP2016/061673; dated Jul. 5, 2016.
(Continued)

*Primary Examiner* — Yemane Mesfin
*Assistant Examiner* — Intekhaab A Siddiquee
(74) *Attorney, Agent, or Firm* — Studebaker & Brackett PC

(57) ABSTRACT

A communication device according to an embodiment comprises: a controller configured to perform radio communication with another communication device in a mobile communication system to which an MDT function is applied. The controller obtains an MDT measurement result obtained by measuring a parameter in the radio communication. The parameter is a parameter affected by a latency reduction function. The controller adds, to the MDT measurement result, identification information on whether or not the latency reduction function is applied, depending on whether or not the latency reduction function is applied to the radio communication.

9 Claims, 5 Drawing Sheets

(51) Int. Cl.
*H04W 16/32* (2009.01)
*H04W 36/12* (2009.01)
*H04W 72/04* (2009.01)
*H04W 76/10* (2018.01)
*H04W 36/00* (2009.01)
*H04W 36/08* (2009.01)

(52) U.S. Cl.
CPC ....... *H04W 36/0055* (2013.01); *H04W 36/08* (2013.01); *H04W 36/12* (2013.01); *H04W 72/04* (2013.01); *H04W 76/10* (2018.02)

(56) References Cited

OTHER PUBLICATIONS

MediaTek, "MDT Latency Measurement", 3GPP TSG RAN WG2 Meeting #77bis, R2-121331, Jeju, Korea, Mar. 24-30, 2012, 8 pages.

* cited by examiner

COMMUNICATION DEVICE

TECHNICAL FIELD

The present invention relates to a communication device in a mobile communication system.

BACKGROUND ART

In (Third Generation Partnership Project) which is a project aiming to standardize a mobile communication system, an MDT (Minimization of Drive Tests) function has been specified.

The MDT function is a function for a communication device to autonomously measure and collect parameters in radio communication without a human intervention to use the collected MDT measurement result for network optimization.

On the other hand, in 3GPP, an introduction of a latency reduction function has been discussed. The function is a function of reducing latency in radio communication.

A technology for realizing such latency reduction function may include a high-speed uplink access technology, a TTI (Transmission Time Interval) shortening technology, or the like.

SUMMARY OF THE INVENTION

A communication device according to an embodiment comprises: a controller configured to perform radio communication with another communication device in a mobile communication system to which an MDT function is applied. The controller obtains an MDT measurement result obtained by measuring a parameter in the radio communication. The parameter is a parameter affected by a latency reduction function. The controller adds, to the MDT measurement result, identification information on whether or not the latency reduction function is applied, depending on whether or not the latency reduction function is applied to the radio communication.

A communication device according to an embodiment comprises: a controller configured to perform radio communication with another communication device in a mobile communication system to which an MDT function is applied. The controller determines, depending on whether or not a latency reduction function is applied to the radio communication, whether or not to perform a process for obtaining an MDT measurement result obtained by measuring a parameter in the radio communication. The parameter is a parameter affected by the latency reduction function.

DESCRIPTION OF THE EMBODIMENT

Overview of Embodiment

If a latency reduction function is specified, in an MDT measurement result obtained by the MDT function, an MDT measurement result of a user terminal (or a bearer) to which the latency reduction function is applied, and an MDT measurement result of a user terminal (or a bearer) to which the latency reduction function is not applied may be mixed.

If such MDT measurement result is used for network optimization, there is a concern in which incorrect network optimization may occur.

In an embodiment below, a technology is disclosed by which it is possible to appropriately perform network optimization, even if the latency reduction function is specified.

A communication device according to a first embodiment comprises: a controller configured to perform radio communication with another communication device in a mobile communication system to which an MDT function is applied. The controller obtains an MDT measurement result obtained by measuring a parameter in the radio communication. The parameter is a parameter affected by a latency reduction function. The controller adds, to the MDT measurement result, identification information on whether or not the latency reduction function is applied, depending on whether or not the latency reduction function is applied to the radio communication.

A communication device according to a second embodiment comprises: a controller configured to perform radio communication with another communication device in a mobile communication system to which an MDT function is applied. The controller determines, depending on whether or not a latency reduction function is applied to the radio communication, whether or not to perform a process for obtaining an MDT measurement result obtained by measuring a parameter in the radio communication. The parameter is a parameter affected by the latency reduction function.

[Overview of Mobile Communication System]

Hereinafter, overview of an LTE system being a mobile communication system according to an embodiment will be described.

(1) Configuration of Mobile Communication System)

Figure 1:
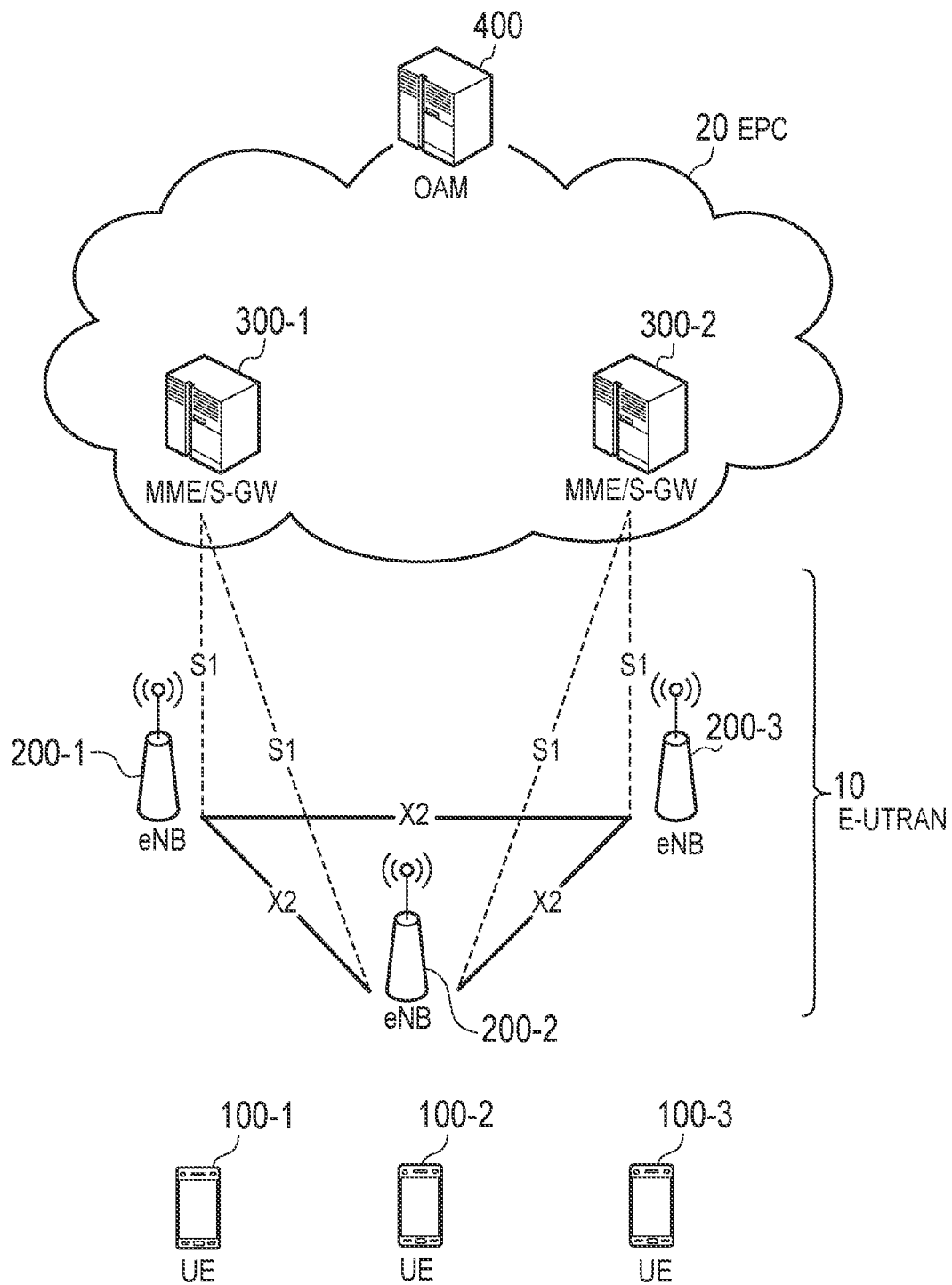
FIG. 1 is a diagram illustrating a configuration of an LTE system.

FIG. 1 is a diagram illustrating a configuration of an LTE system. As shown in FIG. 1, the LTE system according to the embodiment includes UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell). Configuration of the UE 100 will be described later.

The E-UTRAN 10 corresponds to a radio access network. The E-UTRAN 10 includes eNBs 200 (evolved Node-Bs). The eNB 200 corresponds to a base station. The eNBs 200 are connected mutually via an X2 interface. Configuration of the eNB 200 will be described later.

The eNB 200 manages a cell or a plurality of cells and performs radio communication with the UE 100 that establishes a connection with the cell of the eNB 200. The eNB 200, for example, has a radio resource management (RRM) function, a function of routing user data (Hereinafter, simply referred to as "data"), and a measurement control function for mobility control and scheduling. It is noted that the "cell"

is used as a term indicating a minimum unit of a radio communication area, and is also used as a term indicating a function of performing radio communication with the UE 100.

The EPC 20 corresponds to a core network. The EPC 20 includes MME (Mobility Management Entity)/S-GW (Serving-Gateway) 300. The MME performs various mobility controls and the like, for the UE 100. The S-GW performs control to transfer data. The MME/S-GW 300 is connected to the eNB 200 via an S1 interface. The E-UTRAN 10 and the EPC 20 configure a network.

The LTE system further includes an (Operation and Maintenance) 400. The OAM 400 is a network apparatus performing maintenance and maintenance of the E-UTRAN 10 and the EPC 20, and corresponds to a maintenance and maintenance apparatus.

(2) Configuration of Radio Interface

Figure 2:
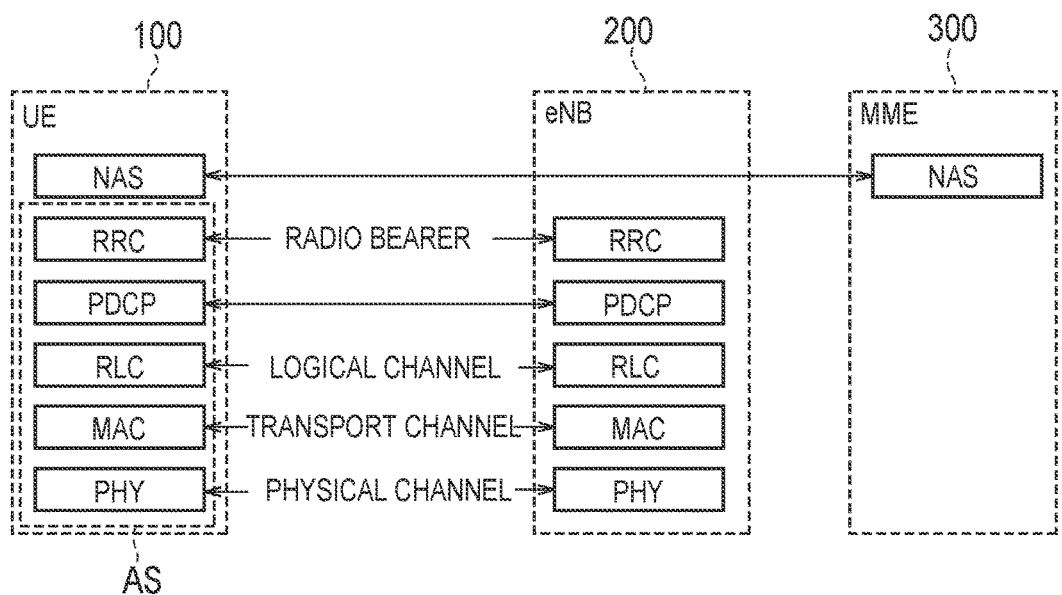
FIG. 2 is a protocol stack diagram of a radio interface in the LTE system.

FIG. 2 is a protocol stack diagram of a radio interface in the LTE system. As shown in FIG. 2, the radio interface protocol is classified into a layer 1 to a layer 3 of an OSI reference model, wherein the layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and a control signal are transmitted through the physical channel.

The MAC layer performs priority control of data, a retransmission process by hybrid ARQ (HARQ), a random access procedure, and the like. Between the MAC layer of the UE 100 and the MAC layer of the eNB 200, data and a control signal are transmitted via a transport channel. The MAC layer of the eNB 200 includes a scheduler to decide a transport format of an uplink and a downlink (a transport block size, a modulation and coding scheme (MCS)) and an allocated resource block to the UE 100.

The RLC layer transmits data to an RLC layer of a reception side by using the functions of the MAC layer and the PHY layer. Between the RLC layer of the UE 100 and the RLC layer of the eNB 200, data and a control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a message (an RRC message) for various types of setting is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in an RRC connected mode, and when the connection is not established, the UE 100 is in an RRC idle mode.

NAS (Non-Access Stratum) layer positioned above the RRC layer performs session management, mobility management and the like.

The physical layer, the MAC layer, the RLC layer, the PDCP layer, and the RRC layer constitute an AS (Access Stratum) entity. The NAS layer constitutes a NAS entity.

(3) Configuration of Radio Frame

Figure 3:
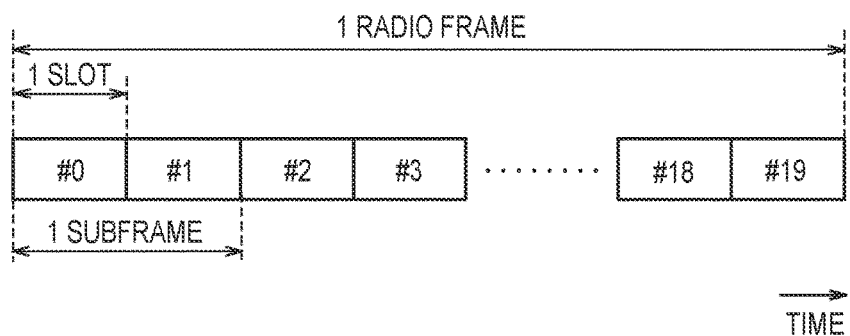
FIG. 3 is a configuration diagram of a radio frame used in the LTE system.

FIG. 3 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As shown in FIG. 3, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. A resource element (RE) is configured by one symbol one subcarrier. In addition, among radio resources (time-frequency resources) allocated to the UE 100, a frequency resource is specified by a resource block and a time resource is specified by a subframe (or slot).

(or slot).

In the downlink, an interval of several symbols at the head of each subframe is a region mainly used as a physical downlink control channel (PDCCH) for transmission of a downlink control signal. Details of the PDCCH will be described latter. Furthermore, the remaining portion of each subframe is a region mainly that can be used as a physical downlink shared channel (PDSCH) for transmission of a downlink data.

In the uplink, both end portions in the frequency direction of each subframe are regions mainly used as a physical uplink control channel (PUCCH) for transmission of an uplink control signal. Furthermore, the remaining portion of each subframe is a region that can be mainly used as a physical uplink shared channel (PUSCH) for transmission of an uplink data.

(4) Configuration of User Terminal

Figure 4:
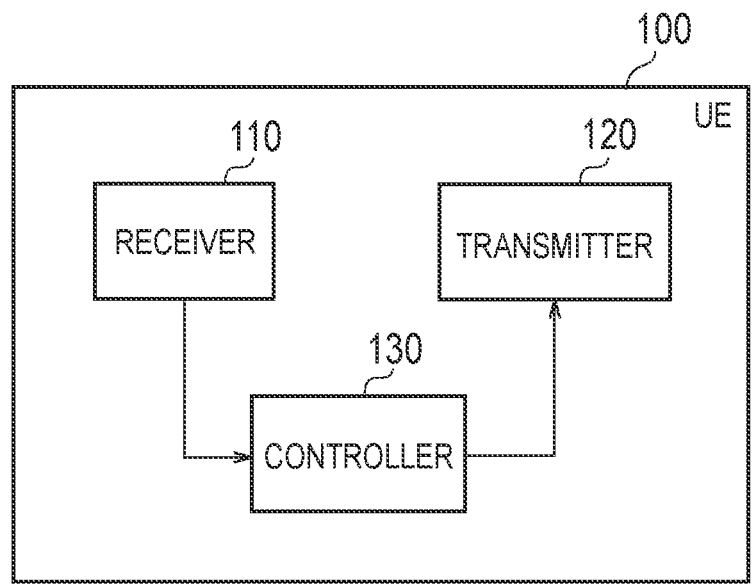
FIG. 4 is a block diagram of a UE (user terminal).

FIG. 4 is a block diagram of the UE 100 (user terminal). As illustrated in FIG. 4, the UE 100 comprises: a receiver 110, a transmitter 120, and a controller 130.

The receiver 110 performs various types of receptions under the control of the controller 130. The receiver 110 comprises an antenna and a receiver unit. The receiver unit converts a radio signal received by the antenna into a baseband signal (received signal), and outputs the baseband signal to the controller 130.

The transmitter 120 performs various types of transmissions under the control of the controller 130. The transmitter 120 comprises an antenna and a transmitter unit. The transmitter unit converts a baseband signal (transmitted signal) output from the controller 130 into a radio signal, and transmits the radio signal from the antenna.

The controller 130 performs various types of controls in the UE 100. The controller 130 comprises a processor and a memory. The memory stores a program executed by the processor, and information used for a process by the processor. The processor comprises a baseband processor configured to perform modulation and demodulation, coding and decoding and the like on a baseband signal, and a CPU (Central Processing Unit) configured to execute the program stored in the memory to perform various types of processes. The processor may comprise a codec that performs coding and decoding on sound and video signals. The processor executes various types of communication protocols described above and processes described later.

The UE 100 may comprise a GNSS (Global Navigation Satellite System) receiver unit. The GNSS receiver unit is used for obtaining detailed location information for indicating a geographical location of the UE 100.

(5) Configuration of Base Station

Figure 5:
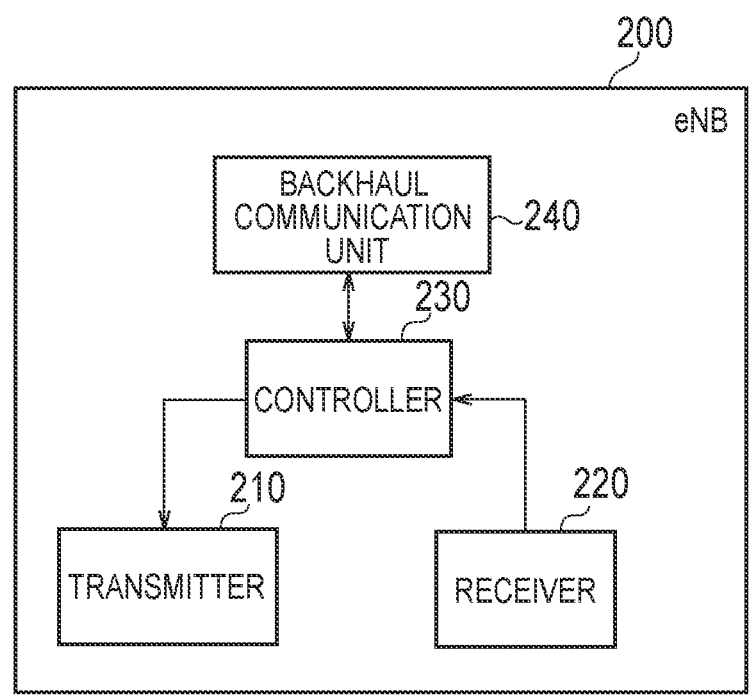
FIG. 5 is a block diagram of an eNB (base station).

FIG. 5 is a block diagram of the eNB 200 (base station). As illustrated in FIG. 5, the eNB 200 comprises: a transmitter 210, a receiver 220, a controller 230, and a backhaul communication unit 240.

The transmitter 210 performs various types of transmissions under the control of the controller 230. The transmitter 210 comprises an antenna and a transmitter unit. The transmitter unit converts a baseband signal (transmitted signal) output from the controller 230 into a radio signal, and transmits the radio signal from the antenna.

The receiver 220 performs various types of receptions under the control of the controller 230. The receiver 220 comprises an antenna and a receiver unit. The receiver unit converts a radio signal received by the antenna into a baseband signal (received signal), and outputs the baseband signal to the controller 230.

The controller 230 performs various types of controls in the eNB 200. The controller 230 comprises a processor and a memory. The memory stores a program executed by the processor, and information used for a process by the processor. The processor comprises a baseband processor configured to perform modulation and demodulation, coding and decoding and the like on a baseband signal, and a CPU (Central Processing Unit) configured to execute the program stored in the memory to perform various types of processes. The processor executes various types of communication protocols described above and processes described later.

The backhaul communication unit 240 is connected to a neighboring eNB 200 via the X2 interface and is connected to the MME/S-GW 300 via the S1 interface. The backhaul communication unit 240 is used for communication performed on the X2 interface, communication performed on the S1 interface, and the like.

First Embodiment

Hereinafter, a first embodiment will be described.

(1) Overview of MDT Function

The MDT function is a function for a communication device to autonomously measure and collect parameters in radio communication without a human intervention to use the collected MDT measurement result for network optimization. In the first embodiment, a case of measuring a QoS parameter is supposed.

Figure 6:
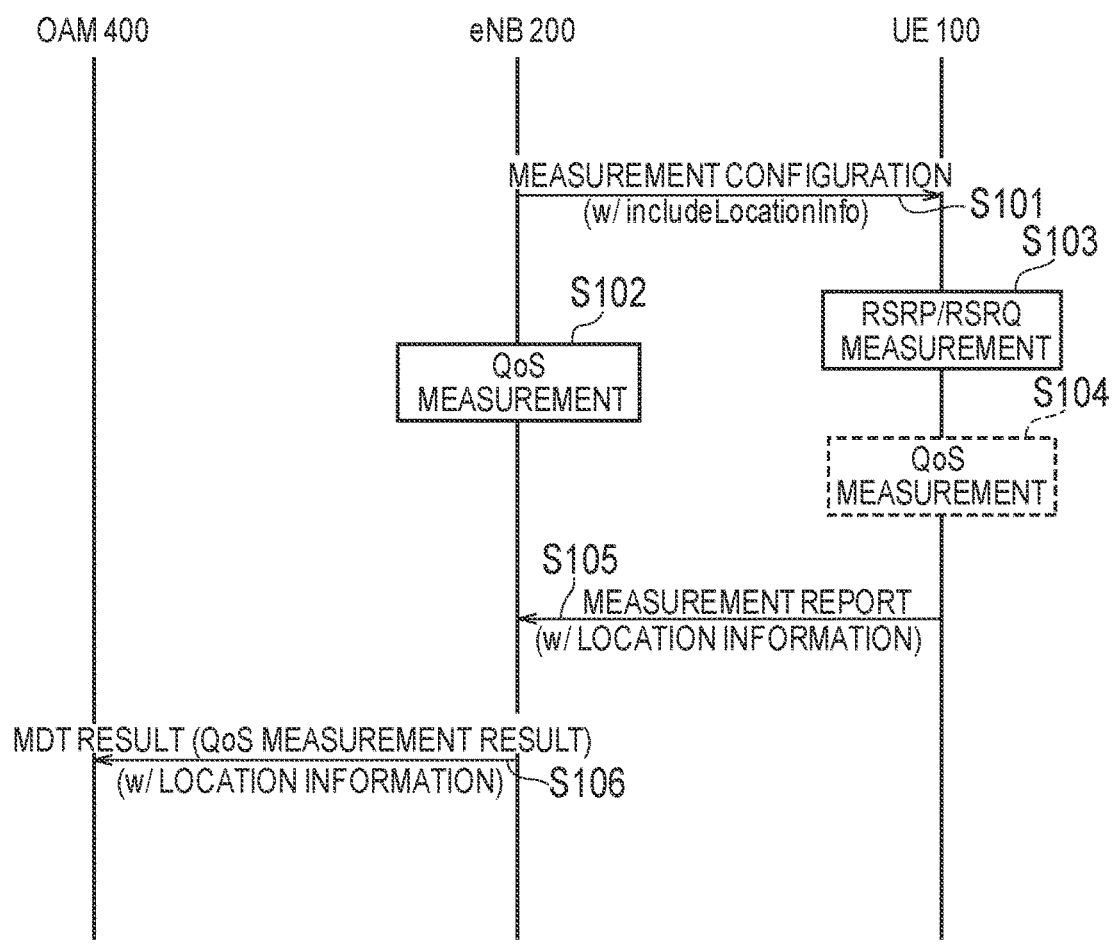
FIG. 6 is a sequence diagram for describing an MDT function according to an embodiment.

FIG. 6 is a sequence diagram for describing the MDT function. The UE 100 is in an RRC connected mode in a cell of the eNB 200 and performs radio communication (data communication) with the eNB 200.

As illustrated in FIG. 6, in step S101, the eNB 200 transmits, to the UE 100, configuration information (Measurement Configuration) for configuring a measurement in the UE 100. The "Measurement Configuration" is included in an individual RRC message.

The "Measurement Configuration" includes information (includeLocationInfo) requesting a Measurement Report including a measurement result to include location information. The "Measurement Configuration" may include information (obtainLocation) requesting detailed location information (GNSS location information) to be included as location information.

In step S102, the eNB 200 measures a QoS parameter (QoS measurement) in radio communication with the UE 100. The QoS parameter is at least one of: "Data Loss", "Scheduled IP Throughput" (throughput), "Data Volume" (data amount), and "Packet Delay". The "Packet Delay" corresponds to latency. The QoS parameter may be separately measured between the uplink and the downlink. Furthermore, the QoS parameter may be measured for: each UE 100, each bearer (radio access beare (RAB)), or each QoS class identifier (QCI).

On the other hand, in step S103, the UE 100 measures, based on the "Measurement Configuration", a reference signal received power (RSRP) and/or a reference signal received quality (RSRQ) (RSRP/RSRQ measurement). Furthermore, the UE 100 obtains location information indicating a geographical location of the UE 100.

In step S104, the UE 100 may perform the QoS measurement. Specifically, the eNB 200 measures, as an example, the "Packet Delay" of the downlink and the UE 100 measures the "Packet Delay" of the uplink. It is noted that the eNB 200 may measure the "Packet Delay" of the uplink and the UE 100 may measure the "Packet Delay" of the downlink. Furthermore, step S104 may be omitted.

In step S105, the UE 100 transmits the "Measurement Report" to the eNB 200, based on the "Measurement Configuration". The "Measurement Report" includes not only the RSRP/RSRQ measurement result but also includes location information. The "Measurement Report" may include the QoS measurement report that is a result of QoS measurement in S104.

The eNB 200 adds the location information included in the "Measurement Report" to the QoS measurement result obtained in step S102 to produce an "MDT result". The "MDT result" may include the QoS measurement result obtained in step S104. The "MDT result" may include the RSRP/RSRQ measurement result obtained in step S103.

In step S106, the eNB 200 transmits the "MDT result" including the QoS measurement report to a core network side (the OAM 400). The OAM 400 uses the "MDT result" for network optimization. Alternatively, the eNB 200 may use the "MDT result" for optimization of the eNB 200 (or a cell of the eNB 200) without transmitting the "MDT result" to the OAM 400.

It is noted that a case is described here in which the QoS measurement is mainly performed by the eNB 200, but the QoS measurement may be mainly performed by the UE 100.

Furthermore, a case is described here in which the QoS measurement is performed by "Immediate MDT", but the QoS measurement may be performed by "Logged MDT". In the "Logged MDT", the UE 100 maintains the measurement result as a log instead of immediately reporting the measurement result to the network, and transmits the log to the network at a predetermined trigger. The log includes a measurement result, location information, and a time stamp.

(2) Overview of Latency Reduction Function

A technology for realizing the latency reduction function may include a high-speed uplink access technology, a TTI shortening technology, or the like.

The high-speed uplink access technology is a technology for improving uplink resource allocation to the UE 100 to reduce the latency. Specifically, a time required from an occurrence of the uplink data in the UE 100 to transmission of the uplink data to the eNB 200 can be shortened.

The TTI shortening technology is a technology for shortening the TTI to reduce the latency. For example, a method is assumed in which a radio resource is allocated for each slot instead of for each subframe.

It is noted that the latency reduction function is not applied to a UE 100 in 3GPP release 12 or earlier (or a UE 100 having low capability), as an example. In other words, the latency reduction function is not supported in the UE 100 in 3GPP release 12 or earlier (or UE 100 having low capability).

Thus, the eNB 200 determines whether or not the UE 100 supports the latency reduction function, based on capability information of the UE 100 (UE Capability). The eNB 200 applies the latency reduction function to radio communication with the UE 100 configured to support the latency reduction function. It is noted that if information on whether or not the UE 100 supports the latency reduction function is included in the capability information (UE Capability), the eNB 200 may determine, based on the information, whether or not the UE 100 supports the latency reduction function. If release information supported by the UE 100 is included in the capability information (UE Capability), the eNB 200 may determine whether or not the UE 100 supports the latency reduction function, based on the release information (whether or not the UE 100 supports to a release of the 3GPP employing the latency reduction function).

If applying the latency reduction function, the eNB 200 may transmit configuration information (Configuration) for the latency reduction function to the UE 100. In this case, the UE 100 recognizes that the latency reduction function is applied to radio communication with the eNB 200.

It is noted that the latency reduction function may be applied to each UE 100 and may be applied to each bearer.

(3) Operation According to First Embodiment

The communication device according to the first embodiment performs radio communication with another communication device in the mobile communication system to which the MDT function is applied. The communication device includes a controller configured to obtain the MDT measurement result obtained by measuring a parameter in radio communication. The parameter is a parameter affected by the latency reduction function. The controller adds, to the MDT measurement result, identification information on whether or not the latency reduction function is applied, depending on whether or not the latency reduction function is applied to the radio communication. In the first embodiment, the MDT measurement parameter is the QoS parameter, and the MDT measurement result is the QoS measurement result. The QoS parameter includes latency.

For example, the communication device according to the first embodiment (that is, an entity configured to add identification information to the MDT measurement result) is the eNB 200, and another communication device is the UE 100. Alternatively, the communication device according to the first embodiment (that is, an entity configured to add identification information to the MDT measurement result) may be the UE 100 and another communication device may be the eNB 200.

Figure 7:
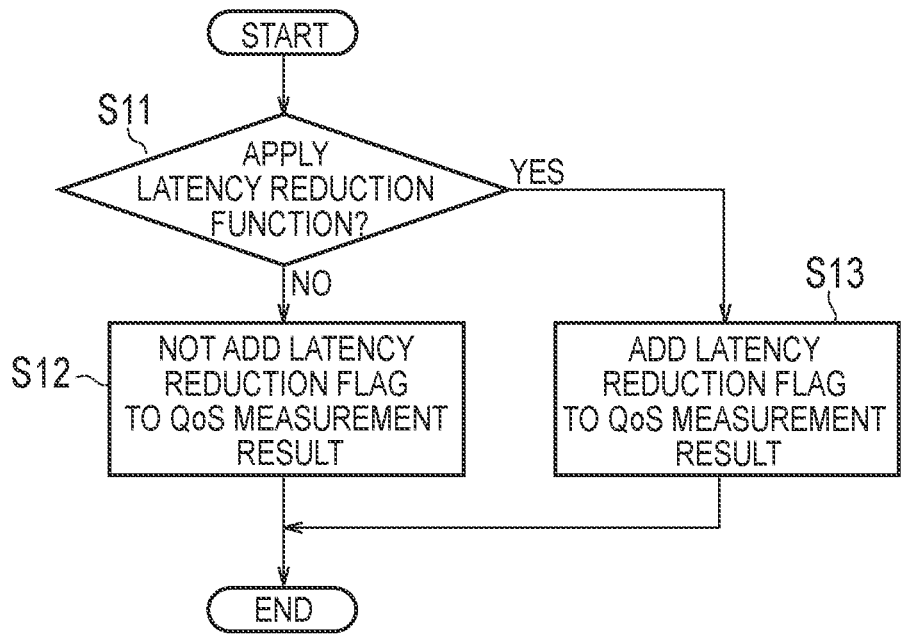
FIG. 7 is a flow chart illustrating an example of an operation according to a first embodiment.

FIG. 7 is a flow chart illustrating an example of an operation according to the first embodiment. Here, a case is assumed in which the communication device according to the first embodiment is the eNB 200 and another communication device is the UE 100.

As illustrated in FIG. 7, in step S11, the eNB 200 determines whether or not the latency reduction function is applied to radio communication with the UE 100.

If the latency reduction function is not applied to the radio communication with the UE 100 (step S11: NO), the eNB 200 does not add, to the QoS measurement result, a flag (identification information) indicating the application of the latency reduction function in step S12. Alternatively, the eNB 200 may add, to the QoS measurement result, a flag (identification information) indicating that the latency reduction function is not applied.

On the other hand, if the latency reduction function is applied to the radio communication with the UE 100 (step S11: YES), the eNB 200 adds, to the QoS measurement result, the flag (identification information) indicating the application of the latency reduction function in step S13. For example, the eNB 200 adds the flag to the QoS measurement result obtained in step S102 in FIG. 6, and transmits the "MDT result" including the flag (QoS measurement result) to the OAM 400 (step S106). Alternatively, the eNB 200 may add the flag to the QoS measurement result obtained from the UE 100 in step S105 in FIG. 6, and transmit the "MDT result" including the flag (QoS measurement result) to the OAM 400 (step S106).

Alternatively, if the communication device according to the first embodiment is the UE 100 and another communication device is the eNB 200, the flow illustrated in FIG. 7 is executed by the UE 100.

For example, if the latency reduction function is applied to radio communication with the eNB 200, the UE 100 adds, to the QoS measurement result obtained in step S104 in FIG. 6, a flag (identification information) indicating the application of the latency reduction function. Then, the UE 100 transmits, to the eNB 200, the "Measurement Report" including the QoS measurement result added with the flag (step S105). It is noted that a flag may be added for each QoS measurement result obtained, and one flag may be added to a plurality of QoS measurement results (one "Measurement Report"). In this case, the eNB 200 may transmit the "MDT result" including the QoS measurement result without adding a new flag to the QoS measurement result obtained from the UE 100. It is noted that a case in which the QoS measurement is performed by "Immediate MDT" is mainly assumed, but the QoS measurement may be performed by the "Logged MDT". In this case, a flag may be added for each log including the QoS measurement result and one flag may be added to a plurality of logs.

(4) Summary of First Embodiment

According to the first embodiment, it is possible to distinguish between the MDT measurement result of the UE 100 or radio communication (a bearer) to which the latency reduction function is applied, and the MDT measurement result of the UE 100 or radio communication (a bearer) to which the latency reduction function is not applied, and thus, incorrect network optimization can be prevented.

For example, the MDT measurement result in a worst case is beneficial from the perspective of network optimization. Thus, the network optimization may be performed, based only on the MDT measurement result of the UE 100 or radio communication (a bearer) to which the latency reduction function is not applied.

Modification of First Embodiment

The identification information on whether or not the latency reduction function is applied may include information indicating a type of the latency reduction function (for example, high-speed uplink access technology/TTI shortening technology). Therefore, the eNB 200, the OAM 400, and the like can grasp the applied type of latency reduction function.

Furthermore, the identification information on whether or not the latency reduction function is applied may include information indicating the bearer to which the latency reduction function is applied (for example, GBR bearer/Non-GBR bearer). Therefore, the type of bearer to which the latency reduction function is applied can be grasped.

Second Embodiment

A second embodiment will be described while focusing on differences from the first embodiment, below.

The communication device according to the second embodiment performs radio communication with another communication device in a mobile communication system to which the MDT function is applied. The communication device includes a controller configured to determine, depending on whether or not the latency reduction function is applied to the radio communication, whether or not to perform a process for obtaining the MDT measurement result obtained by measuring a parameter in the radio communication. The parameter is a parameter affected by the latency reduction function.

Figure 8:
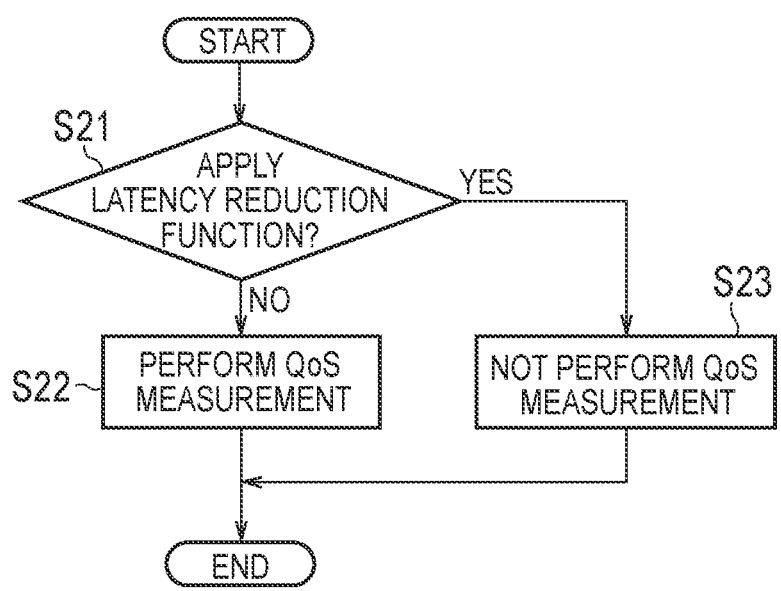
FIG. 8 is a flow chart illustrating an example of an operation according to a second embodiment.

FIG. 8 is a flow chart illustrating an example of an operation according to the second embodiment. Here, a case is assumed in which the communication device according to the second embodiment (that is, an entity configured to determine whether or not to perform a process for obtaining an MDT measurement result) is the eNB 200, and another communication device is the UE 100.

As illustrated in FIG. 8, in step S21, the eNB 200 determines whether or not the latency reduction function is applied to radio communication with the UE 100.

If the latency reduction function is not applied to the radio communication with the UE 100 (step S21: NO), the eNB 200 determines to perform QoS measurement in step S22. In this case, an operation following a sequence in FIG. 6 (a process including step S102) will be performed.

On the other hand, if the latency reduction function is applied to the radio communication with the UE 100 (step S21: YES), the eNB 200 determines not to perform QoS measurement in step S23. In this case, the eNB 200 does not apply the MDT function to the UE 100, or will not perform the process of step S102 in FIG. 6. Alternatively, the eNB 200 may discard the QoS measurement result after performing the process of step S102 in FIG. 6.

It is noted that the flow illustrated in FIG. 8 may be executed for each UE 100, or executed for each bearer.

Alternatively, if the communication device according to the second embodiment (that is, an entity configured to determine whether or not to perform a process for obtaining the MDT measurement result) is the UE 100 and another communication device is the eNB 200, the flow illustrated in FIG. 8 is executed by the UE 100.

For example, if the latency reduction function is applied to radio communication with the eNB 200, the UE 100 does not perform the QoS measurement in step S104 in FIG. 6. Alternatively, the UE 100 may discard the QoS measurement result, after performing a process of step S104 in FIG. 6, without reporting to the eNB 200.

According to the second embodiment, similarly to the first embodiment, incorrect network optimization can be prevented.

Modification of Second Embodiment

In the second embodiment described above, if the latency reduction function is applied to the radio communication, the communication device determines not to perform a process for obtaining the MDT measurement result.

However, the MDT measurement result where the latency reduction function is applied may need to be grasped. Thus, the MDT measurement result where the latency reduction function is applied may be collected by switching "YES" and "NO" in FIG. 8 for a certain period, for example. It is noted that a parameter unaffected by the latency reduction function may be measured, even if the latency reduction function is applied, and the measurement result may be reported to the eNB 200 or the OAM 400 as the MDT measurement result. Furthermore, the measurement result of the parameter unaffected by the latency reduction function may not be added with identification information on the latency reduction function.

Other Embodiments

It is noted that the first embodiment and the second embodiments were described based on the MDT function, but it is not limited to this, and may be based on measurements other than the MDT function.

The above-described first embodiment and second embodiment may be performed individually and may also be performed through a combination thereof. For example, some configurations of one embodiment may be added to the configuration of the other embodiment, and some configurations of one embodiment may be replaced with some configurations of the other embodiment.

In the above-described first embodiment and second embodiment, the LTE system exemplified as the mobile communication system. However, the present invention is not limited to the LTE system. The present invention may be applied to systems other than the LTE system.

Cross Reference

The entire content of U.S. Provisional Application No. 62/148,953 (filed on Apr. 17, 2015) is incorporated into the present specification by reference.

The invention claimed is:
1. A communication device, comprising:
a controller configured to perform radio communication with another communication device in a mobile communication system to which an MDT function is applied, wherein
the controller is configured to obtain an MDT measurement result obtained by measuring a parameter in the radio communication,
the parameter is a parameter affected by a latency reduction function,
the controller is further configured to determine whether or not the latency reduction function is applied to the radio communication in which the parameter is measured, and
the controller is configured to add, to the MDT measurement result, identification information indicating that the latency reduction function is applied, upon determining that the latency reduction function is applied to the radio communication.
2. The communication device according to claim 1, wherein
the parameter is a QoS parameter in the radio communication, and
the MDT measurement result is a QoS measurement result.
3. The communication device according to claim 2, wherein the QoS parameter includes latency.
4. The communication device according to claim 1, wherein
the another communication device is a user terminal,
the communication device is a base station,
the MDT measurement result is obtained as a result of the base station performing the measurement, and
the controller transmits, to a core network, the MDT measurement result added with the identification information.

5. The communication device according to claim 1, wherein
the another communication device is a base station,
the communication device is a user terminal,
the MDT measurement result is obtained as a result of the user terminal performing the measurement, and
the controller transmits, to the base station, the MDT measurement result added with the identification information.

6. A communication device, comprising:
a controller configured to perform radio communication with another communication device in a mobile communication system to which an MDT function is applied, wherein
the controller is configured to determine whether or not a latency reduction function is applied to the radio communication,
the controller is further configured to determine whether or not to perform a process for obtaining an MDT measurement result obtained by measuring a parameter in the radio communication, depending on the determination of whether or not the latency reduction function is applied to the radio communication, wherein
in a case that the latency reduction function is applied to the radio communication, the controller determines to perform the process for obtaining the measurement result, and
in a case that the latency reduction function is not applied to the radio communication, the controller determines not to perform the process for obtaining the measurement result, wherein
the parameter is a parameter affected by the latency reduction function.

7. The communication device according to claim 6, wherein
the controller determines not to perform the process on a user terminal or a bearer to which the latency reduction function is applied.

8. The communication device according to claim 6, wherein
the parameter is a QoS parameter in the radio communication, and
the MDT measurement result is a QoS measurement result.

9. The communication device according to claim 6, wherein the QoS parameter includes latency.

* * * * *